United States Patent Office 3,775,427
Patented Nov. 27, 1973

3,775,427
POLYISOCYANATES CONTAINING HYDANTOIN GROUPS
Juergen Habermeier, Pfeffingen, Basel-Land, and Daniel Porret, Binningen, Switzerland, assignors to Ciba-Geigy AG, Basel, Switzerland
No Drawing. Filed Oct. 4, 1971, Ser. No. 186,496
Claims priority, application Switzerland, Oct. 6, 1970, 14,762/70
Int. Cl. C07d 49/32
U.S. Cl. 260—309.5          4 Claims

ABSTRACT OF THE DISCLOSURE

Polyisocyanates are manufactured by adding 2 mols of a polyisocyanate, such as isophoronediisocyanate or toluylene-2,4-diisocyanate, onto one mol of a bis-hydantoin, such as, for example, 1,6-bis(5',5'-dimethylhydantoinyl-3')-hexane. Example: The new diisocyanate of the formula

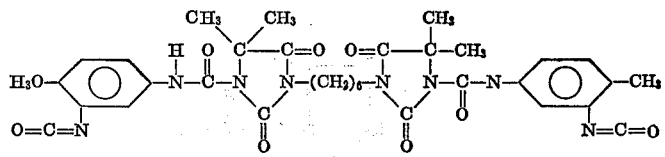

These compounds may be used to prepare polymers which are used as fibers, films, foams and adhesives.

---

The subject of the present invention are new polyisocyanates of the formula

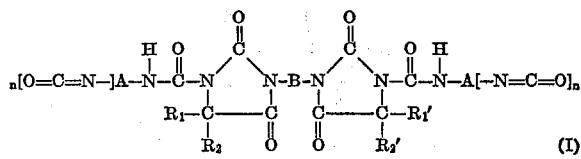     (I)

wherein A denotes a $(n+1)$-valent aliphatic, cycloaliphatic or cycloaliphatic-aliphatic, araliphatic, aromatic or heterocyclic-aliphatic radical, B represents a divalent aliphatic, cycloaliphatic, cycloaliphatic-aliphatic or araliphatic radical, $R_1$, $R_2$, $R_1'$ and $R_2'$ each denote a hydrogen atom or an aliphatic, cycloaliphatic, araliphatic or aromatic hydrocarbon radical or $R_1$ and $R_2$, or $R_1'$ and $R_2'$, together form a divalent aliphatic or cycloaliphatic hydrocarbon radical, and wherein $n$ represents an integer having a value of at least 1 and at most 3.

In the above Formula I, B preferably denotes an aliphatic hydrocarbon radical which is optionally interrupted by ether-oxygen, or denotes a radical of the formula

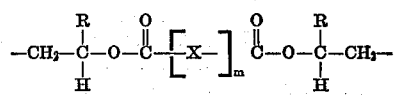

wherein R represents hydrogen, an alkyl radical with 1–2 C atoms or a phenyl radical and X represents the hydrocarbon radical of a dicarboxylic acid and $m$ is the number 0 or 1, and $R_1$, $R_2$, $R_1'$ and $R_2'$ preferably denote hydrogen atoms or lower alkyl radicals with 1 to 4 carbon atoms, or X, $R_1$ and $R_2$ or $R_1'$ and $R_2'$ together denote the tetramethylene or pentamethylene radical, and $n$ preferably denotes the number 1.

Depending on the starting substances, the new polyisocyanates are liquid or solid, colourless to ochre-coloured, clear transparent substances.

They can be crosslinked with the customary curing agents for polyisocyanates, for example with polyols, polyamines or polymercaptans, as a rule whilst shaping the material, to give plastics. Reaction with diols or polyalcohols, for example polyester-glycols or polyether-glycols, yields polyurethanes which are used as fibres, films, foams, adhesives, mouldings or, especially, compression-mouldings powders, in accordance with the employed polyisocyanates according to the invention and polyalcohols. A descriptive summary of the manufacture of polyurethanes is given in Vieweg-Höchtlen, Kunststoffhandbuch (Plastics Handbook), volume 7, page 207 and thereafter.

Additionally, the new polyisocyanates according to the invention can be used for the manufacture of polyureas, wherein the polyisocyanates are reacted with organic diamines or polyamines. Since the isocyanate group can add onto urea groupings already formed, branched or crosslinked polyureas containing biuret groups are produced.

The new polyisocyanates of the Formula I are manufactured, according to the invention, by reacting, with warming, 1 mol of a bis-hydantoin of the general formula

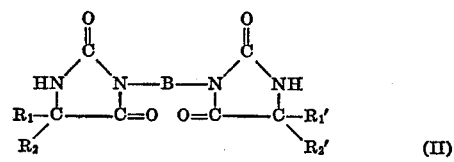
(II)

with 2 mols of a polyisocyanate of the general formula $$A[-N=C=O]_{n+1} \qquad (III)$$

wherein the symbols A, B, $R_1$, $R_2$, $R_1'$ $R_2'$ and $n$ have the same meaning in the Formulae II and III as in the Formula I.

The reaction of the bis-hydantoins (II) with the polyisocyanates (III) is advantageously carried out in the temperature range of 60–200° C., preferably at temperatures of 80–150° C. It can be carried out in the presence of solvents, but the reaction is preferably carried out in the absence of solvents. It is advantageous to react the bis-hydantoins (II) with the polyisocyanates (III) in the stoichiometric quantity ratio (molar ratio 1:2), but it is also possible to employ the polyisocyanates in a stoichiometric excess, so that the molar ratio of the bis-hydantoin (II) to the polyisocyanate (III) in the reaction mixture can, for example, be between 1:2 and 1:20.

A preferred sub-category of bis-hydantoins which are employed as starting substances corresponds to the general formula

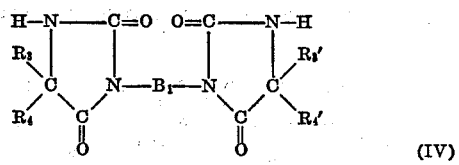
(IV)

wherein $B_1$ denotes an aliphatic, cycloaliphatic or araliphatic hydrocarbon radical which is optionally interrupted by oxygen atoms or sulphur atoms and $R_3$, $R_4$, $R_3'$ and $R_4'$ represent hydrogen atoms or lower alkyl radicals with 1 to 4 carbon atoms, or $R_3$ and $R_4$ or $R_3'$ and $R_4'$ together denote the tetramethylene radical or pentamethylene radical. As examples of bis-hydantoins of the Formula IV there may be mentioned:

bis-(5,5-dimethylhydantoinyl-3)methane,
1,4-bis-(5',5'-dimethylhydantoinyl-3')-butane,
1,2-bis-(5',5'-dimethylhydantoinyl-3')-ethane,
1,12-bis-(5',5'-dimethylhydantoinyl-3')-dodecane,
1,6-bis-(5',5'-dimethylhydantoinyl-3')-hexane,
β,β'-bis-(5',5'-dimethylhydantoinyl-3')-diethyl-ether,
1,4-bis-(5'-n-propylhydantoinyl-3')-butane and
3,3'-tetramethylene-bis-(1,3-diazaspiro[4.5]-decane-2,4-dione).

The bis-hydantoins of the Formula IV can easily be obtained in accordance with the process described in U.S. Pat. 3,296,208, by condensation of 1 mol of each of the two hydantoins of the formulae

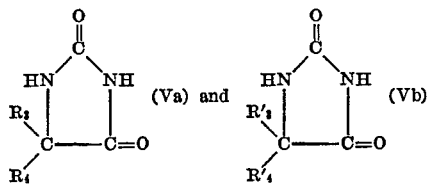

((Va) and (Vb) can be identical or different hydantoins) with 1 mol of a dihalide of the formula

wherein Hal represents a halogen atom and $B_1$ has the same meaning as in the Formula IV, in the presence of 2 equivalents of alkali.

As examples of hydantoins of the Formula Va or Vb there may be mentioned: hydantoin, 5-methyl-hydantoin, 5-ethyl-hydantoin, 5-n-propyl-hydantoin, 5-isopropylhydantoin, 1,3-diaza-spiro(4.4)nonane-2,4-dione, 1,3-diazaspiro - (4.5)decane - 2,4 - dione, 5,5 - diethyl-hydantoin, 5-methyl-5-ethyl-hydantoin and especially 5,5-dimethylhydantoin.

As dihalides of the Formula VI there may be mentioned: methylene chloride, 1,2-dichloroethane, 1,2- or 1,3-dichloropropane, 1,2- or 1,3- or 1,4- or 2,3-dichlorobutane, 1,2- or 1,3- or 1,4- or 1,5- or 2,3- or 2,4-dichloropentane, the corresponding dichlorohexanes, dichloroheptanes, dichlorooctanes, dichlorononanes, dichlorodecanes, dichloroundecanes, dichlorododecanes, dichlorohexadecanes and dichlorooctadecanes, 1,4-dichloro-2-butene, di-2-chloroethylformal, di-2-chloroethylether, 1,4-dichloro-2-methylbutane, 1,3-dichloro-2-hydroxypropane, 1,5-dichloro-2,2-dimethylpentane, di-(β-chloroethyl)-thio-ether, di-(β-chloroethyl)-ether, 1,2-, 1,3- or 1,4-dichlorocyclohexane, 4,4'-dichlorodicyclohexylmethane, 4,4'-dichlorodicyclohexyldimethylmethane, 1,2-, 1,3- or 1,4-dichloromethylbenzene, 1,4-diiodobutane, 1,5-dibromopentane, 1,4-dibromo-2-butene, 1,8-dibromooctane, α,α'-dibromo-o-, -m-, or -p-xylene, glycol-bis-chloroacetate and the bis-monochloroacetates of lower polyglycols.

Preferably, the ω,ω'-bis-(5,5-dimethyl-hydantoinyl-3) derivatives of straight-chain hydrocarbons of the paraffin series are used as starting substances of the Formula IV.

A further preferred sub-category of bis-hydantoins which serve as starting substances for the process according to the invention correspond to the general formula

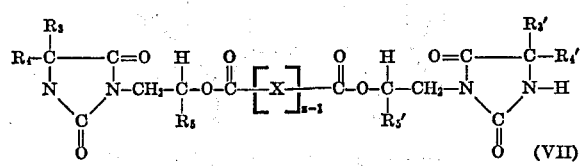

wherein $R_3$, $R_4$, $R_3'$ and $R_4'$ have the same meaning as in the Formula IV and wherein $R_5$ and $R_5'$ each represent a hydrogen atom, a methyl group, an ethyl group or a phenyl group, X represents a hydrocarbon radical of a dicarboxylic acid, obtained by removing the carboxyl groups, and z denotes the number 1 or 2. The following may be mentioned:

bis-[3-(2'-hydroxyethyl)-5,5-dimethylhydantoin]-sebacic acid ester,
bis-[3-(2'-hydroxyethyl)-5,5-dimethylhydantoin]-succinic acid ester,
bis-[3-(2'-hydroxy-n-propyl)-5,5-dimethylhydantoin]-sebacic acid ester,
bis-[3-(2'-hydroxyl-n-butyl)-5,5-dimethylhydantoin]-sebacic acid ester,
bis-[3-(2'-hydroxy-n-butyl)-5,5-dimethylhydantoin]-adipic acid ester and
bis-[3-(2'-hydroxy-n-propyl)-5,5-dimethylhydantoin]-glutaric acid ester.

The symmetrical diesters of the Formula VII can be manufactured according to known methods, by esterifying 1 mol of a dicarboxylic acid of the formula

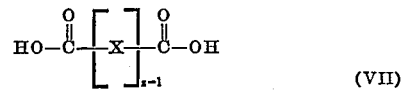

with 2 mols of a N-heterocyclic monoalcohol of the formula

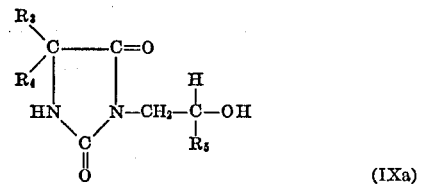

or of the formula

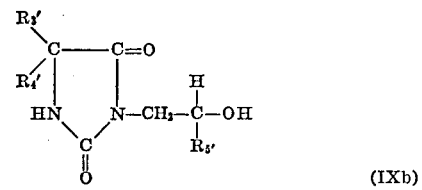

Diesters of unsymmetrical structure of the Formula VII can be obtained, for example, by first partially esterifying 1 mol of a dicarboxylic acid (VIII) with 1 mol of a monoalcohol of the Formula IXa and, in a second stage, producing the diester using 1 mol of a monoalcohol (IXb) which differs from the monoalcohol (IXa).

Possible dicarboxylic acids of the Formula VIII are those of the aliphatic, cycloaliphatic, araliphatic and aromatic series. There may be mentioned: oxalic acid, malonic acid, succinic acid, glutaric acid, adipic acid, pimelic acid, suberic acid, azelaic acid, sebacic acid, nonanedicarboxylic acid, decanedicarboxylic acid, undecanedicarboxylic acid, dodecanedicarboxylic acid, allylsuccinic acid, dodecylsuccinic acid, dodecenylsuccinic acid, $\Delta^4$-tetrahydrophthalic acid, hexahydrophthalic acid, 4-methylhexahydrophthalic acid, 3,6 - endomethylene-$\Delta^4$-tetrahydrophthalic acid, methyl-3,6 - endomethylene-$\Delta^4$-tetrahydrophthalic acid, 3,4,5,6,7,7 - hexachloro-3,6-endomethylene-$\Delta^4$-tetrahydrophthalic acid, diphenic acid, phenylenediacetic acid, hydroquinone-O,O'-diacetic acid, diomethane-O,O'-diacetic acid, phthalic acid, isophthalic acid, terephthalic acid, tetrachlorophthalic acid and naphthalenedicarboxylic acid.

The monoalcohols of the Formula IXa or IXb are obtained in a known manner by reacting 1 mol of a hydantoin of the Formula Va or Vb with 1 mol of a monoepoxide of the formula

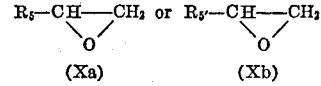

first in the presence of a suitable catalyst, $Z_1$ or $Z_2$ and $R_1$ or $R_2$ having the same meaning as in the Formula I.

Suitable monoepoxides of the Formula Xa or Xb are ethene oxide (ethylene oxide), propene oxide (propylene oxide), 1,2-butene oxide or styrene oxide.

Since the endocyclic —NH— group located between two carbonyl groups is more strongly acid, it reacts preferentially with the monoepoxide, so that if only a slight excess of the monoepoxide over the stoichiometric amount required for the formation of a monoalcohol is employed, the monoalcohol of the Formula IXa or IXb is produced practically quantitatively.

The addition of the monoepoxide to the more strongly acid NH— group of the N-heterocyclic compound can be carried out in the presence of either acid or alkaline catalysts, in solution or in the melt.

Preferably, however, alkaline catalysts, such as tetraethylammonium chloride or tertiary amines, are used in the manufacture of the monoalcohols. However, alkali halides, such as lithium chloride or sodium chloride, can also be used successfully for this addition reaction; the reaction also takes place without catalysts.

Possible polyisocyanates of the Formula III are above all diisocyanates of the aliphatic, cycloaliphatic, araliphatic, aromatic and heterocyclic-aliphatic series.

As diisocyanates of the aliphatic, cycloaliphatic and araliphatic series there may be mentioned: ethylenediisocyanate, trimethylenediisocyanate, tetramethylenediisocyanate, hexamethylenediisocyanate, decamethylenediisocyanate, 2,2,4- and 2,4,4-trimethylhexamethylenediisocyanate or their technical mixtures; diisocyanates of the formula OCN—Y—NCO, wherein Y denotes the hydrocarbon radical of an optionally hydrogenated dimerised fatty alcohol; cyclopentylene-1,3-diisocyanate, cyclohexylene-1,4-diisocyanate, -1,3-diisocyanate or -1,2-di-isocyanate, hexahydrotoluylene-2,4-diisocyanate or -2,6-diisocyanate, 3,5,5-trimethyl-3-isocyanatomethyl-cyclohexene - 1 - isocyanate (="isophorone-diisocyanate"); dicyclohexyl-methane-4,4'-diisocyanate; o-, m- and p-xlylene-α,α-diisocyanate.

As diisocyanates of the aromatic series there may be mentioned: toluylene-2,4 - diisocyanate, toluylene-2,6-diisocyanate or their technical mixtures; diphenylmethane-4,4'-diisocyanate, naphthalene - 1,5 - diisocyanate, 3,3'-dimethyl-4,4'-diisocyanate, 3,3' - dimethyl-biphenyl-4,4'-diisocyanate, 3,3'-dimethoxy - 4,4' - diphenyl-diisocyanate, 3,3'-dichloro-diphenyl - 4,4' - diisocyanate, 4,4'-diphenyl-diphenyl-diisocyanate, diphenyl-dimethyl-methane - 4,4'-diisocyanate, p,p'-dibenzyl-diisocyanate, phenyl-1,4-diisocyanate; phenylene-1,3-diisocyanate, 2,3,5,6-tetramethyl-p-phenylene-diisocyanate; the ureadionediisocyanates obtainable by dimerisation of aromatic diisocyanates, such as, for example, of 2,4-toluylenediisocyanate, for example 1,3-bis-(4'-methyl - 3' - isocyanato-phenyl-)-ureadione of the formula

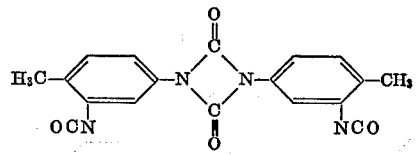

N,N'-di-(4-methyl-3-isocyanate-phenyl)-urea

Additionally, the following diisocyanates can be employed: the addition products of 2 mols of toluylene-2,4-diisocyanate to one mol of a glycol, as discussed by E. Müller in Houben-Weyl, 4th edition, vol. XIV/2, on pages 66 and 71–72, and also the corresponding addition products of 2 mols of "isophoronediisocyanate" to 1 mol of a glycol.

As diisocyanates of the heterocyclic-aliphatic series there may be mentioned:

1,3-di-(γ-isocyanatopropyl)-hydantoin;
1,3-di-(γ-isocyanatopropyl)-5-methyl-hydantoin;
1,3-di-(γ-isocyanatopropyl)-5,5-dimethyl-hydantoin;
1,3-di-(γ-isocyanatopropyl)-5-methyl-5-ethyl-hydantoin;
1,3-di-(γ-isocyanatopropyl)-5-ethyl-hydantoin;
1,3-di-(γ-isocyanatopropyl)-5-propyl-hydantoin;
1,3-di-(γ-isocyanatopropyl)-5-isopropyl-hydantoin;
1,3-di-(γ-isocyanatopropyl)-1,3-diaza-spiro-(4,4)-nonane-2,4-dione and
1,3-di-(γ-isocyanatopropyl)-1,3-diaza-spiro-(4,5)-decane-2,4-dione;
1,3-di-(γ-isocyanatopropyl)-5,5-dimethyl-5,6-dihydrouracil and
1,3-di-(γ-isocyanatopropyl)-6-methyl-5,6-dihydrouracil;
1,1'-methylene-bis-(3-γ-isocyanatopropylhydantoin);
1,1'-methylene-bis-(3-γ-isocyanatopropyl-5,5-dimethylhydantoin);
1,1'-methylene-bis-(3-γ-isocyanatopropyl-5-methyl-5-ethylhydantoin);
bis-(1'-γ-isocyanatopropylhydantoin-3')-methane;
1,2-bis-(1'-γ-isocyanatopropyl-5,5'-dimethyl-hydantoinyl-3')-ethane;
1,4-bis-(1'-γ-isocyanatopropyl-5'-methyl-5'-ethyl-hydantoinyl-3')-butane;
1,6-bis-(1'-γ-isocyanatopropyl-5'-isopropyl-hydantoin-3')-hexane;
1,12-bis-(1'-γ-isocyanatopropyl-5',5'-pentamethylenehydantoinyl-3')-dodecane and
β,β'-bis-('-γ-isocyanatopropyl-5',5'-dimethyl-hydantoinyl-3')-diethyl-ether.

Furthermore, triisocyanates and tetraisocyanates of the aliphatic, cycloaliphatic, araliphatic, aromatic or heterocyclic series can also be employed. As such there may, for example, be mentioned; benzene-1,3,5-triisocyanate, toluylene-2,4,6-triisocyanate, ethylbenzene-2,4,6-triisocyanate, monochlorobenzene,2,4,6-triisocyanate, triphenylmethane - 4,4',4'' - triisocyanate, diphenyl-2,4,4'-triisocyanate, 4,4'-methylene - bis - (o-toluylenediisocyanate) and thiophosphoric acid-tris-(4-isocyanato-phenyl ester).

Further, triisocyanates and tetraisocyanates having a biuret structure can be employed, such as are obtainable, for example, by reaction of 3 to 4 mols of a diisocyanate with 1 mol of a diamine, for example, a ω,ω'-diaminopolyether (compare German published specification 1,215,365).

Equally, it is possible to employ triisocyanates or tetraisocyanates which can be manufactured by addition to trihydroxy or tetrahydroxy compounds, for example 1,1,1-trimethylolpropane or pentaerythritol, of 1 mol per hydroxyl group of a diisocyanate of which the two isocyanate groups have different reactivities (for example, 2,4-toluylene-diisocyanate or "isophoronediisocyanate").

The new polyisocyanates of the Formula I can be reacted, in a known manner, with compounds which possess hydrogen atoms replaceable by alkali. As examples of such compounds or classes of compounds there may be mentioned: alcohols, amines, carboxylic acids, phenols, ureas, urethanes, hydrazines, water, ammonia, bisulphate, imines, thioureas, sulphimides, amides, thiols, aminoalcohols, sulphonamides, hydrazones, semicarbazones, oximes, hydroxycarboxylic acids, aminocarboxylic acids and all polymers which contain active hydrogen atoms, for example in the form of hydroxyl, carboxyl, amino or mercapto groups. The new polyisocyanates of the Formula I can be employed both alone or as mixtures with other known isocyanates, diisocyanates or polyisocyanates, together with polyfunctional H-active compounds, for the purpose of polyaddition and/or crosslinking to give plastics. Depending on the nature and amount of the crosslinks, both very firm brittle materials and plastics having rubbery-elastic properties can be manufactured.

To manufacture thermoplastics, the polyisocyanates of the Formula I can be reacted with glycols, such as ethylene glycol, 1,3-propylene glycol, 1,4-butanediol or any desired dialcohols which can also carry isocyclic, aromatic or heterocyclic groups, linear hetero-groups or ester groups.

Possible crosslinking agents or curing agents are above all those classes of compounds which give three-dimensionally crosslinked, infusible and insoluble products with the polyisocyanates of the Formula I.

As crosslinking agents or curing agents of this nature, polyhydroxyl compounds are above all employed. As examples, there may be mentioned polyesters, containing hydroxyl groups, from adipic acid, phthalic acid or dimerised unsaturated fatty acids with diols and/or triols, such as ethylene glycol, 1,4-butanediol, 1,5-pentanediol, glycerol and diethylene glycol; castor oil, linear or partially branched polypropylene-ether-glycols and polytetramethylene-ether-glycols; polythioether-glycols and polyacetal-glycols; sugars and sugar derivatives; higher-functional polyols, such as trimethylolpropane.

Further possible crosslinking agents are above all the polyamines, especially aromatic polyamines, such as diaminodiphenylmethane, and such compounds as simultaneously contain hydroxyl and amino groups, such as, for example, tri-isopropanolamine.

The polyaddition reaction of glycols, polyhydroxy compounds and polyamino compounds with the polyisocyanates of the Formula I can be carried out directly without diluents, and depending on the nature of the reactants temperatures in the range of about 50 to 300° C. may be necessary. The process can also be carried out in diluents, for example halogeno-benzenes.

The molecular weight of the polyurethane can be varied in accordance with the variation of the molar ratio of the components, the removal of the heat of reaction from the melt, the increase in the dwell time in the dissolved state, and the addition of monofunctional, that is to say chain-breaking, components, in a manner which is in itself known. In general it is necessary, for use in the plastics field, to polymerise the mixture to an average molecular weight of about 6,000. Low molecular types are above all used in the lacquer field.

The polyaddition reaction can also be carried out in the presence of accelerators; this is, however, not absolutely essential. Possible catalysts are, especially, tertiary amines such as pyridine, N,N'-dimethylpiperazine, N,N-dimethylbenzylamine, tributylamine, triethylamine, N-methylmorpholine, N-methylpyrrole, N-methylpyyrolidine, diaza-(2,2,2)-bicyclooctane or diethyl-2-hydroxyethyl-amine, and also metal salts, such as $FeCl_3$, $AlCl_3$, $ZnCl_2$, $SnCl_2$, $tin^{II}$ isooctoate, lead octoate, lead naphthenate and the dilaurate of tin-dibutyl. A survey of the most customary catalysts is furthermore to be found in "Houben-Weyl," 4th edition, volume XIV/2 on page 61 (review by E. Müller).

To manufacture foams, blowing agents and surface-active substances, such as, for example, silicone compounds, acting as foam stabilisers, can furthermore be used conjointly, in a manner which is in itself known.

The manufacture of polyurethane plastics products is as a rule carried out with simultaneous shaping to give castings, foam articles, pressings, lacquer films, laminates, adhesive bonds and the like. Here, the procedure followed is to produce a mixture of the polyisocyanate of the Formula I and the polyhydroxy compound as well as of the catalyst and/or blowing agent, foam stabiliser and the like which are optionally used conjointly, and then to allow this mixture, after it has been introduced into casting or compression-moulding moulds, spread as coatings or introduced into adhesive joints and the like, to react on application of heat, so as to give the plastic.

A further subject of the invention are therefore moulding compositions which under the action of heat can be converted into mouldings of foam articles including sheet-like structures, such as coatings or adhesive joints, and which contain (a) a polyisocyanate of the Formula (I) and (b) a polyhydroxy compound and also, optionally, a curing catalyst and/or blowing agent and foam stabilisers.

Further customary additives for polyisocyanate moulding compositions, such as fillers, reinforcing agents, mould release agents, antioxidants, anti-ageing agents, light protection agents, UV-absorbers, flameproofing substances, optical brighteners, dyestuffs or pigments can, of course, be added to the moulding compositions.

Suitable fillers or reinforcing agents are fibrous or pulverulent inorganic or organic substances. Quartz powder, hydrated aluminium oxide, mica, aluminium powder, iron powder, iron oxide, ground dolomite, chalk powder, gypsum, slate powder, unburnt kaolin (Bolus), glass fibres, boron fibers, carbon fibres, asbestos fibres, natural and synthetic textile fibres, such as polyester, polyamide and polyacrylonirtile fibres, and especially fillers of high water absorbency, such as, for example, anhydrous silicon dioxide, silica aerogel, anhydrous aluminium oxide, active charcoal, zeolites, bentonites and burnt kaolin may be mentioned.

The moulding compositions can furthermore be used, in the unfilled or filled state, as dipping resins, casting resins, laminating resins, impregnating resins, lacquers, coating agents, sealing compositions potting and insulating compositions for the electrical industry, or adhesives.

In addition to manual processing, the mechanical methods of processing for the manufacture of polyurethane plastics, which permit continuous mixing of the polyisocyanates (a) with the components (b) containing hydroxyl groups, to form a homogeneous melt, can appropriately be used. Thus, the most diverse moulded articles (hard rubber substitutes) can be manufactured by casting or centrifugal casting. Further applications are to be found in the field of casting compositions for filling joints or sealing pipe couplings, and in use as floor coverings or road surfacings, impression compositions or adhesives. Unsupported films, tapes or filaments can be produced simply, and textiles, fibre materials (leather substitute) or paper can be impregnated or coated simply. The new moulding compositions can, if the reaction speed is appropriately adjusted, for example be used for lining containers or for the manufacture of endless tubes of any profile by means of continuously operating heated injection moulding machines. Rigid foams or hard foams manufactured from foam compositions according to the invention are used, for example, as insulating materials for buildings and refrigeration installations, as packaging materials, and above all for shock absorption, for example as vibration-damping constructional components in vehicle construction and machinery building.

In the examples which follow parts denote parts by weight and percentages denote percentages by weight, unless otherwise stated. The relationship of parts by volume to parts by weight is as of the millilitre to the gram.

MODEL EXPERIMENT

The model experiment which follows shows that organic isocyanates react with the $N_1$—H group of hydantoins to give stable adducts. With 5,5-dimethylhydantoin and phenylisocyanate as the model substances, the reaction takes place as follows:

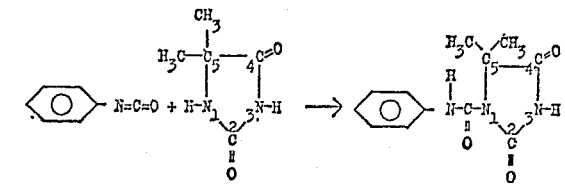

This reaction takes place smoothly and with good yields. It was found that the derivatives thus obtained are at least as heat-stable as the urethanes obtainable from the corresponding isocyanates; this was tested by means of the following experiments:

A mixture of 128.1 g. of 5,5-dimethylhydantoin (1 mol) and 119.2 g. of phenylisocyanate (1 mol) is initially introduced, at room temperature, into a 500 ml. glass flask equipped with stirrer, thermometer and reflux condenser. The resulting paste is heated to 150° C. internal temperature over the course of 15 minutes, whilst stirring. After about 80 minutes under the conditions mentioned, a clear, mobile melt results. This is stirred for a further 2 hours at 160° C. to complete the reaction. On cooling, the mass immediately crystallises. 233 g. of light yellow crystals (yield: 94.3% of theory) are obtained.

For purification, the product is recrystallised from absolute ethanol. Practically colourless, fine crystals are obtained in 69.6% yield of pure material (172 g.); these crystals melt at 166–168° C.

Elementary analysis gives the following results:

| Found: | Calculated: |
|---|---|
| 58.11% C. | 58.29% C |
| 5.33% H | 5.30% H |
| 16.85% N | 17.00% N |

The infrared spectrum shows, through the presence of bands for an aromatic ring and bands for the hydantoin skeleton, that the desired product has been produced. This result is further strengthened through the presence of three amide-N—H frequencies (3280 cm.$^{-1}$, 3202 cm.$^{-1}$ and 3095$^{-1}$) and by three carbonyl absorption bands (1782 cm.$^{-1}$, 1740 cm.$^{-1}$ and 1710 cm.$^{-1}$).

The proton-magnetic resonance spectrum (60 Mc-H-NMR, recorded in deuterochloroform at 35° C., with tetramethylsilane as the internal standard) also shows, through the presence of the signals for the aromatic ring at δ=6.95–7.55 (multiplet), the signals for CH$_3$ and N$_3$—H— group of the hydantoin and the signal for the urea-amide (N—H) group, that the end product obtained has the structure given below:

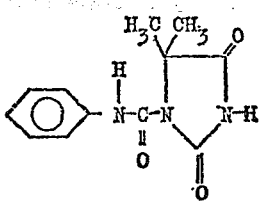

A sample of 70 g. of the compound synthesised in this way is investigated, in a glass flask fitted with descending condenser and thermometer, for thermal reverse decomposition into phenylisocyanate and dimethylhydantoin. At a bath temperature of 175° C., the substance is completely fused and displays a temperature of 168° C.; no signs of decomposition are detectable. The temperature of the sample is now rapidly raised to 205° C. and here again no trace of decomposition is a yet visible. At 215° C., very slight bubble formation in the melt is detectable. At 232° C. a slow decomposition starts, and when the temperature of the sample is 240° C., phenylisocyanate begins to distil off. At 260° C., a relatively rapid distillation starts.

As a result of this experiment, the decomposition point of the substance can be stated to be about 220–230° C., whilst urethanes from primary aliphatic alcohols and aromatic isocyanates already decompose from about 200° C. onwards.

(A) MANUFACTURING EXAMPLES

Example 1

237 g. of bis-(3-(2'-hydroxy-n-propyl)-5,5,5-dimethylhydantoin)-sebacic acid ester (0.44 mol) are stirred, in a glass flask equipped with thermometer and reflux condenser, at a bath temperature of 115° C. whilst excluding moisture; the internal temperature is between 105° C. and 112° C. 196 g. (0.88 mol) of 3,5,5-trimethyl-3-isocyanatomethyl-cyclohexane-1-isocyanate (=isophoronediisocyanate) are added dropwise over the course of 40 minutes. Thereafter the clear, mobile melt is stirred for a further 8 hours at 140° C. The substance is then introduced into a glass bottle whilst still warm. After cooling, the new diisocyanate is a highly viscous, clear, transparent, light ochre-coloured liquid. The isocyanate content is 8.7% (theory 8.55%).

The infrared spectrum shows, through the following absorption bands, that the anticipated structural elements are present: 3390 cm.$^{-1}$, 2960 cm.$^{-1}$, 2899 cm.$^{-1}$, 2270 cm.$^{-1}$, 1780 cm.$^{-1}$, 1725$^{-1}$ and 1700 cm.$^{-1}$.

Elemental analysis shows the following:

| Found: | Calculated: |
|---|---|
| 61.4% C | 61.1% C |
| 8.0% H | 8.0% H |
| 11.4% N | 1.4% N |

The new product accordingly essential consists of the diisocyanate of the following structure:

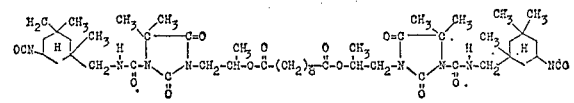

Example 2

269.0 g. of bis-(3-(2'-hydroxy-n-propyl)-5,5-dimethylhydantoin)-sebacic acid ester (0.5 mol) are reacted with 174.3 g. of toluylene-2,4-diisocyanate (1.0 mol) as described in Example 1, and under analogous conditions. The reaction is complete after 3.5 hours at 140° C.

A clear, transparent, light ochre-coloured viscous resin is obtained, of isocyanate content 9.5% (theory: 9.5%). The product essentially consists of the diisocyanate of the formula

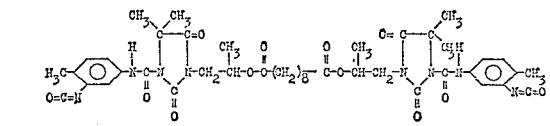

Example 3

269 g. of bis(3-(2'-hydroxy-n-propyl)-5,5-dimethylhydantoin)-sebacic acid ester (0.5 mol) are reacted with 168.2 g. of hexamethylenediisocyanate (1.0 mol) analogously to Example 1. The reaction is complete after 10 hours at 145° C.

The highly viscous resin of light yellow colour, which is thus obtained, has a NCO content of 9.70% (theory: 9.7%). The yield is quantitative. The new product accordingly essentially consists of the diisocyanate of the formula:

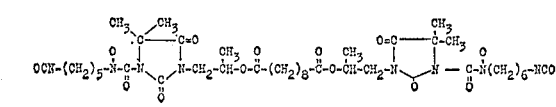

Example 4

A mixture of 338.4 g. of 1,6-bis-(5',5'-dimethylhydantoinyl-3')-hexane (1 mol) and 348.3 g. of toluylene-2,4-diisocyanate (2 mols) is stirred for 6.5 hours at 140–150° C. in an apparatus like that described in Example 1.

On cooling, the melt solidifies to give glass-clear, colourless lumps which soften at about 65–70° C.; after recrystallisation from ether, the substance melts at 96–100° C. The isocyanate content of the substance is 11.62% (theory: 12.25%).

Elementary analysis shows the following:

| Found: | Calculated: |
|---|---|
| 59.4% C | 59.5% C |
| 5.6% H | 5.6% H |
| 16.4% N | 16.3% N |

Determination of the molecular weight by vapour pressure osmometry shows $M_{os}$=677 ($M_{theory}$=686.7).

The mass spectrum also shows, through the molecular-ion ($M_1$) at 686, that the molecular weight agrees with theory. Furthermore, characteristic (fragment-ions are found at the following mass units: 512 (=$M_1$−174), 338 ($M_1$−2x 174) and 324 (=338—CH$_3$).

The infrared spectrum shows, through the following absorption (in cm.⁻¹), that the structural formula given below applies:

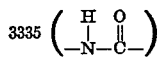

2285 (NCO), 1785, 1735, 1709 (C=O), 770 and 755.

Equally, the proton-magnetic resonance spectrum (60 Mc-H-NMR, recorded in CDCl₃ at 35° C., against tetramethylsilane) shows, through the presence of the signals for the following structural elements, that the structural formula given below is correct:

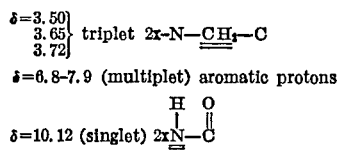

The product thus essentially consists of the diisocyanate of the formula:

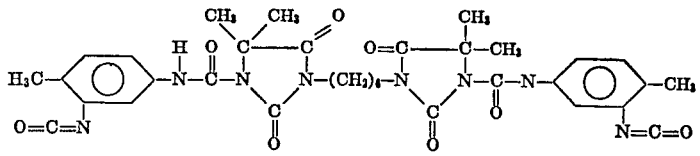

Example 5

A mixture of 244 g. of β,β'-bis-(5,5-dimethylhydantoinyl-3)-diethyl-ether (0.75 mol) and 2.69 g. of hexamethylenediisocyanate (1.60 mols) is stirred at 100° C. The reaction becomes somewhat exothermic and after the heating bath is removed the temperature rises to approx. 145° C. At the same time a clear, colourless melt is produced. When the exothermic reaction has subsided, the mixture is stirred for a further 1.5 hours at 135° C.

After cooling, a clear, colourless to pale yellow, viscous diisocyanate is obtained. The NCO content is 11.9% (theory: 12.7%).

Elementary analysis shows the following:

Found:         Calculated:
54.5% C        54.4% C
7.1% H         7.0% H
17.2% N        17.0% N The products essentially consists of the diisocyanate of the following structure:

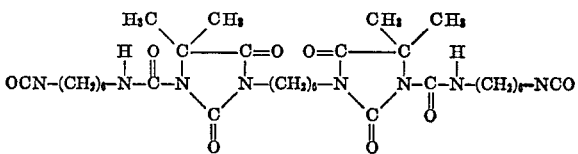

Example 6

240.0 g. of β,β'-bis-(5,5-dimethyl-hydantoinyl-3)-diethyl-ether (0.736 mol) are reacted with 257 g. of toluylene-2,4-diisocyanate (1.472 mols) analogously to Example 5. The reaction becomes slightly exothermic from 120° C. onwards. After a total of 2 hours at 120–135° C. the reaction is complete and the product becomes viscous. It is poured out onto a metal sheet and after cooling solidified glassy lumps are obtained. The practically colourless, brittle solid resin thus obtained has an isocyanate content of 10.35% (theory: 12.45%). It softens at 65–70° C.

The proton-magnetic resonance spectrum (60 Mc-H-NMR; recorded as an 0.3 molar solution in deuterochloroform at 35° C., against tetramethylsilane) shows, through the presence of signals for the following structural elements, that the structural formula given below applies to the product:

δ=10.13   : 2×N—C (H O)
δ=6.6–7.4  6 aromatic protons

δ=3.75   : 2×N—CH₂—CH₂—O

The product essentially consists of the diisocyanate the formula:

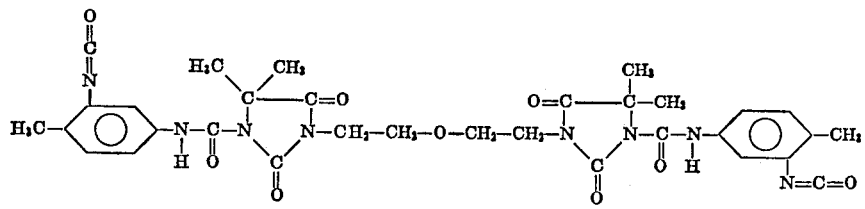

Example 7

A mixture of 80.7 g. of bis(3-(2'-hydroxy-n-propyl)-5,5-dimethylhydantoin)-sebacic acid ester (0.15 mol) and 75.1 g. of 4,4'-diisocyanato-diphenylmethane is heated to 112° C. over the course of one hour and the resulting homogeneous paste is stirred for 30 minutes at this temperature. Thereafter the homogeneous melt is stirred for a further 8 hours at 170° C.

After cooling, 152.5 g. of a hard, brittle, light yellow resin (97.6% of theory) are obtained, having an isocyanate content of 7.1% (theory 8.09%).

Elementary analysis shows the following:

Found:         Calculated:
64.5% C        64.7% C
6.1% H         6.01% H
10.6% N        10.78% N

Example 8

100.3 g. of 88% pure 1,3-di-(γ-isocyanato-propyl)-5,5-dimethylhydantoin (0.3 mol) and 48.9 g. of bis-(5,5-dimethylhydantoinyl-3)-diethyl-ether (0.15 mol) are stirred for 7 hours at 156–158° C. After cooling, a clear, pale yellow melt is obtained, softening at about 40° C. The isocyanate content is 8.8% (theory 9.18%).

Elementary analysis gives the following values:

Found:         Calculated:
51.6% C        51.61% C
17.5% N        18.05% N

(B) USE EXAMPLES

Example I 69.65 parts of the diisocyanate manufactured according to Example 2, containing 9.5% of NCO groups, are processed with 30.34 parts of a commercially available polyester-alcohol from 2.5 mols of adipic acid, 0.5 mol of phthalic acid and 4 mols of triol, commercially available under the registered tradename "Desmophen 800," at 90° C., to give a homogeneous mixture. The gel time of this mixture is 40–50 minutes at 90° C. The cured product is clear, transparent and light yellow and proves to be hard and elastic.

Example II 71 parts of the diisocyanate manufactured according to Example 1, with 8.7% of NCO groups, are mixed with 29 parts of the commercially available polyester-alcohol used in Example I ("Desmophen 800") at 90° C. and the mixture is poured into aluminium moulds of 4 mm. wall thickness.

Curing takes place for 2 hours at 90° C. and then for 12 hours at 125° C. Clear, transparent, bubble-free mouldings of a pale light yellow colour are obtained, having the following properties:

Flexural strength (VSM 77,103) -- 13–15 kp./mm.$^2$
Deflection (VSM 77,103) -------- 4–5 mm.
Impact strength (VSM 77,105) --- 1–14 cm. kp./cm.$^2$.
Boiling water absorption (1 hour/ 100° C.) --------------------- 1.2%.

Example III

A mixture of 303.2 parts of diisocyanate manufactured according to Example 3, with 9.70% of NCO groups, and 135 parts of the commercially available polyester-alcohol ("Desmophen 800") used in Example I are mixed at 70° C. and the mixture is cured in aluminum moulds over the course of 12 hours at 90° C.

Glass-clear, practically colourless mouldings are obtained, having excellent mechanical and good electrical properties.

Flexural strength (VSM 77,103) -- 4–7 kp./mm.$^2$.
Deflection (VSM 77, 103) -------- [1] more than 20 mm.
Water absorption (4 days/20° C.) - 0.7%.
Breakdown voltage -------------- 237.4 mv./cm.
Tracking resistance (VDE) ------ Level KA 3B.
Arcing resistance (DIN) --------- Level L4.
Arcing resistance (ASTM 495) ---- 218 secs.
Dielectric constant at 22° C. ----- 3.4.

[1] No fracture at maximum deflection.

Example IV

A mixture of 174.9 g. of the diisocyanate used in Example III is mixed with 48 g. of a comercially available polyol (Niax LS 490) at 80° C. and cured over the course of 10 hours at 100° C.

Highly flexible mouldings having the following properties are obtained:

Deflection (VSM 77,103) -------- [1] More than 20 mm.
Flexural strength (VSM 77,103) -- 0.3–0.4 kp./mm.$^2$.
Tensile strength (VSM 77,101) --- 1.2 kp./mm.$^2$.
Elongation at break VSM 77,101) - 150.4%.
Water absorption ---------------- 0.8%.

[1] No fracture at maximum deflection.

What is claimed is:
1. A polyisocyanate having the formula

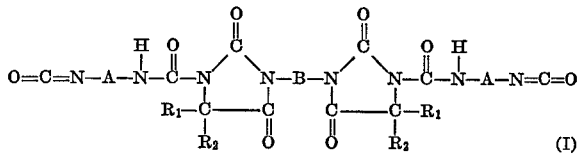

wherein B is alkylene of from 1 to 12 carbon atoms, which is optionally interrupted with a sulfur or oxygen atom, $R_1$ and $R_2$ each denote a hydrogen or lower alkyl, or $R_1$ and $R_2$ together are tetramethylene or pentamethylene; A is phenylene, lower alkyl substituted phenylene, alkylene of from 1 to 10 carbon atoms, cycloalkylene of 5 or 6 carbon atoms, diphenylene, diphenylenemethane, or a group having the formula

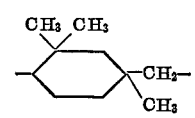

2. Diisocyanate according to patent claim 1, of the formula

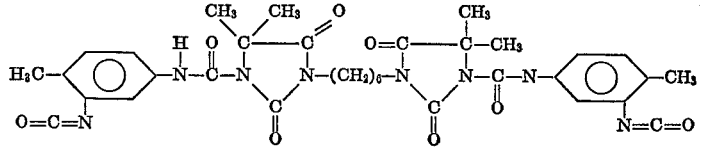

3. Diisocyanate according to patent claim 1, of the formula

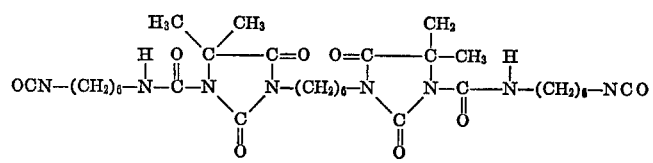

4. Diisocyanate according to patent claim 1, of the formula

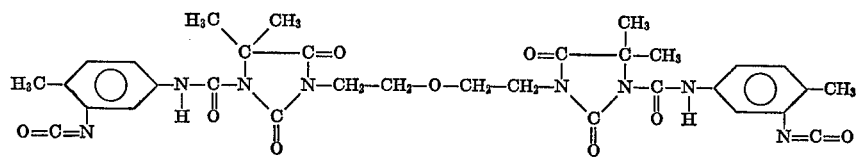

(References on following page)

References Cited

UNITED STATES PATENTS

| | | | |
|---|---|---|---|
| 3,201,372 | 8/1965 | Wagner | 260—453 AB |
| 3,392,183 | 7/1968 | Windemuth et al. | 260—453 AB |

FOREIGN PATENTS

| | | | |
|---|---|---|---|
| 2,018,043 | 10/1970 | Germany | 260—309.5 |

OTHER REFERENCES

Migrdichian: The Chemistry of Organic Compounds, pp. 377-82, New York, Reinhold, 1947.

NATALIE TROUSOF, Primary Examiner

U.S. Cl. X.R.

260—2.5 AT, 37 R, 40 TN, 75 NT, 77.5 AT, 454